(12) United States Patent
Metters et al.

(10) Patent No.: US 8,442,512 B1
(45) Date of Patent: May 14, 2013

(54) DETERMINATION OF WIRELESS COMMUNICATION DEVICE TYPES ASSOCIATED WITH BELOW-AVERAGE CALL DURATIONS

(75) Inventors: Dahl B. Metters, Shawnee Mission, KS (US); Brad Jerald Owens, Stilwell, KS (US); Jamie Deanne Andrews, Archie, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 750 days.

(21) Appl. No.: 12/469,880

(22) Filed: May 21, 2009

(51) Int. Cl.
*H04W 24/00* (2009.01)

(52) U.S. Cl.
USPC ........ 455/423; 455/67.11; 455/405; 455/424; 379/114.01; 379/126

(58) Field of Classification Search .................. 455/405, 455/67.11, 418, 422.1, 423, 424, 425, 453, 455/550.1, 556.1, 560, 561; 379/114.01, 379/114.03, 114.28, 126
See application file for complete search history.

(56) References Cited

U.S. PATENT DOCUMENTS

| 4,371,758 | A | 2/1983 | Ulrich | |
|---|---|---|---|---|
| 4,484,030 | A | 11/1984 | Gavrilovich | |
| 6,876,731 | B2 | 4/2005 | Cerami et al. | |
| 2002/0118813 | A1 | 8/2002 | Brehm et al. | |
| 2003/0185363 | A1* | 10/2003 | Cerami et al. | 379/126 |
| 2008/0214143 | A1* | 9/2008 | Heit et al. | 455/405 |

* cited by examiner

*Primary Examiner* — Anthony Addy
*Assistant Examiner* — Amanuel Lebassi

(57) ABSTRACT

A method of operating a call duration analysis system comprises receiving a plurality of call detail records (CDRs) comprising information associated with a plurality of calls over a wireless communication network, processing the CDRs to determine an average call duration for the wireless communication network, processing the CDRs with the average call duration for the wireless communication network to determine at least one wireless access node associated with a below-average call duration, processing the CDRs associated with the wireless access node to determine a first set of the CDRs associated with the wireless access node exhibiting a good RF status and a second set of the CDRs associated with the wireless access node exhibiting a bad RF status, and processing the first set of the CDRs to determine a wireless communication device type associated with the below-average call duration.

19 Claims, 6 Drawing Sheets

| REC | SOURCE | DESTINATION | DATE | START TIME | STOP TIME | DURATION | SOURCE DEVICE TYPE | DEST. DEVICE TYPE | BASE STATION | RF STATUS |
|---|---|---|---|---|---|---|---|---|---|---|
| 1 | 555-555-5555 | 616-786-9199 | 03/01/09 | 11:20 | 11:22 | 2 | A | S | 1101A | 33 dBm |
| 2 | 303-999-5566 | 571-272-1000 | 03/02/09 | 13:00 | 14:25 | 85 | F | B | 1101A | 31 dBm |
| 3 | 321-456-7890 | 739-435-2215 | 03/02/09 | 10:30 | 10:31 | 1 | W | A | 1101A | 33 dBm |
| 4 | 720-327-2810 | 531-399-0782 | 03/03/09 | 1:00 | 1:20 | 20 | D | N | 1101A | 29 dBm |
| 5 | 602-446-2321 | 212-623-1822 | 03/03/09 | 11:30 | 12:00 | 30 | E | G | 1101A | 32 dBm |
| 6 | 393-455-3190 | 719-216-2409 | 03/03/09 | 9:05 | 9:07 | 2 | A | J | 1101A | 30 dBm |

DETERMINATION OF WIRELESS COMMUNICATION DEVICE TYPES ASSOCIATED WITH BELOW-AVERAGE CALL DURATIONS

TECHNICAL BACKGROUND

Individuals and businesses are becoming increasingly reliant on communication networks to send and receive information. For example, individuals may utilize communication networks for voice communications, research, and entertainment, and organizations typically require the use of high speed data networks such as the Internet for conducting critical business transactions. Since users of communication networks have become dependent on these information services, communication service providers have an interest in ensuring customer satisfaction through the reliability of the network.

One method of ensuring communication network reliability is to identify, track, and determine the impact of poorly performing T1 lines and circuits in a trunk group. For example, a T1 or circuit will often experience echo canceller problems, one-way audio problems, or voice quality issues. Such problems can be identified through data mining procedures from call detail records (CDRs) to determine whether an issue exists. Issues can be determined by finding the average call duration of all calls on a given trunk group circuit, and grouping those averages together into T1 spans across the trunk group. Thresholds can then be determined by analyzing the averages across all of the T1s within the trunk group, and dynamically calculating a threshold for the T1 spans within that trunk group. T1s falling below the threshold are identified as likely malfunctioning T1s.

Overview

A method of operating a call duration analysis system comprises receiving a plurality of call detail records (CDRs) from a network database, wherein the CDRs comprise information associated with a plurality of calls over a wireless communication network, processing the CDRs to determine an average call duration for the wireless communication network, processing the CDRs with the average call duration for the wireless communication network to determine at least one wireless access node associated with a below-average call duration, processing the CDRs associated with the wireless access node to determine a first set of the CDRs associated with the wireless access node exhibiting a good radio frequency (RF) status and a second set of the CDRs associated with the wireless access node exhibiting a bad RF status, and processing the first set of the CDRs to determine a wireless communication device type associated with the below-average call duration.

A software product for operating a call duration analysis system comprises software and a memory device that stores the software. The software comprises computer-readable processing instructions configured to direct a processing system to process a plurality of call detail records (CDRs) to determine an average call duration for a wireless communication network, process the CDRs with the average call duration for the wireless communication network to determine at least one wireless access node associated with a below-average call duration, process the CDRs associated with the wireless access node to determine a first set of the CDRs associated with the wireless access node exhibiting a good radio frequency (RF) status and a second set of the CDRs associated with the wireless access node exhibiting a bad RF status, and process the first set of the CDRs to determine a wireless communication device type associated with the below-average call duration.

A call duration analysis system comprises a first means for receiving a plurality of call detail records (CDRs) from a network database, wherein the CDRs comprise information associated with a plurality of calls over a wireless communication network. The call duration analysis system further comprises a second means for processing the CDRs to determine an average call duration for the wireless communication network, processing the CDRs with the average call duration for the wireless communication network to determine at least one wireless access node associated with a below-average call duration, processing the CDRs associated with the wireless access node to determine a first set of the CDRs associated with the wireless access node exhibiting a good radio frequency (RF) status and a second set of the CDRs associated with the wireless access node exhibiting a bad RF status, and processing the first set of the CDRs to determine a wireless communication device type associated with the below-average call duration.

BRIEF DESCRIPTION OF THE DRAWINGS

FIG. 5 illustrates exemplary call detail records (CDRs).

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
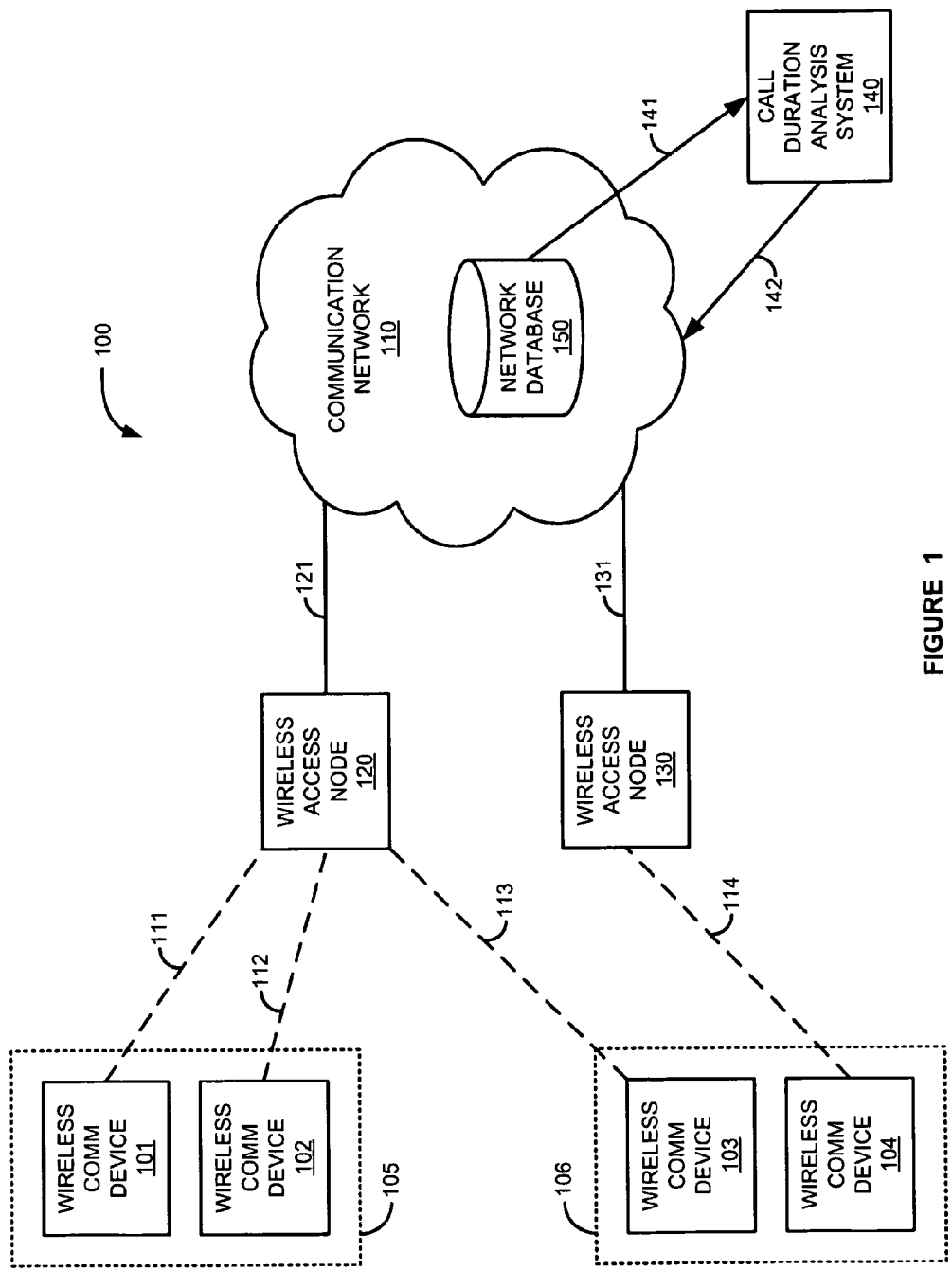
FIG. 1 is a block diagram that illustrates a wireless communication network.

FIG. 1 is a block diagram that illustrates wireless communication network 100. Wireless communication network 100 includes wireless communication devices 101-104, wireless access nodes 120 and 130, communication network 110, and call duration analysis system 140. Communication network 110 comprises network database 150. Call duration analysis system 140 is in communication with network database 150 over communication link 141 and communication network 110 over communication link 142. Wireless communication devices 101, 102, and 103 communicate with wireless access node 120 over respective wireless communication links 111, 112, and 113. Likewise, wireless communication device 104 communicates with wireless access node 130 over wireless communication link 114. Wireless access nodes 120 and 130 communicate with communication network 110 over respective communication links 121 and 131.

Wireless communication devices 101 and 102 are members of device type 105, as shown by the dotted lines surrounding devices 101 and 102. Likewise, wireless communication devices 103 and 104 are members of device type 106, as shown by the dotted lines surrounding devices 103 and 104. Device types 105 and 106 comprise groupings of wireless communication devices that share similar traits. For example, wireless communication devices 101 and 102 of device type 105 could be made by the same manufacturer, or could be the same model number. In another example, wireless communication devices 103 and 104 of device type 106 could share similar features, such as utilizing the same wireless communication protocol or protocols, or have some other aspects in common.

Figure 2:
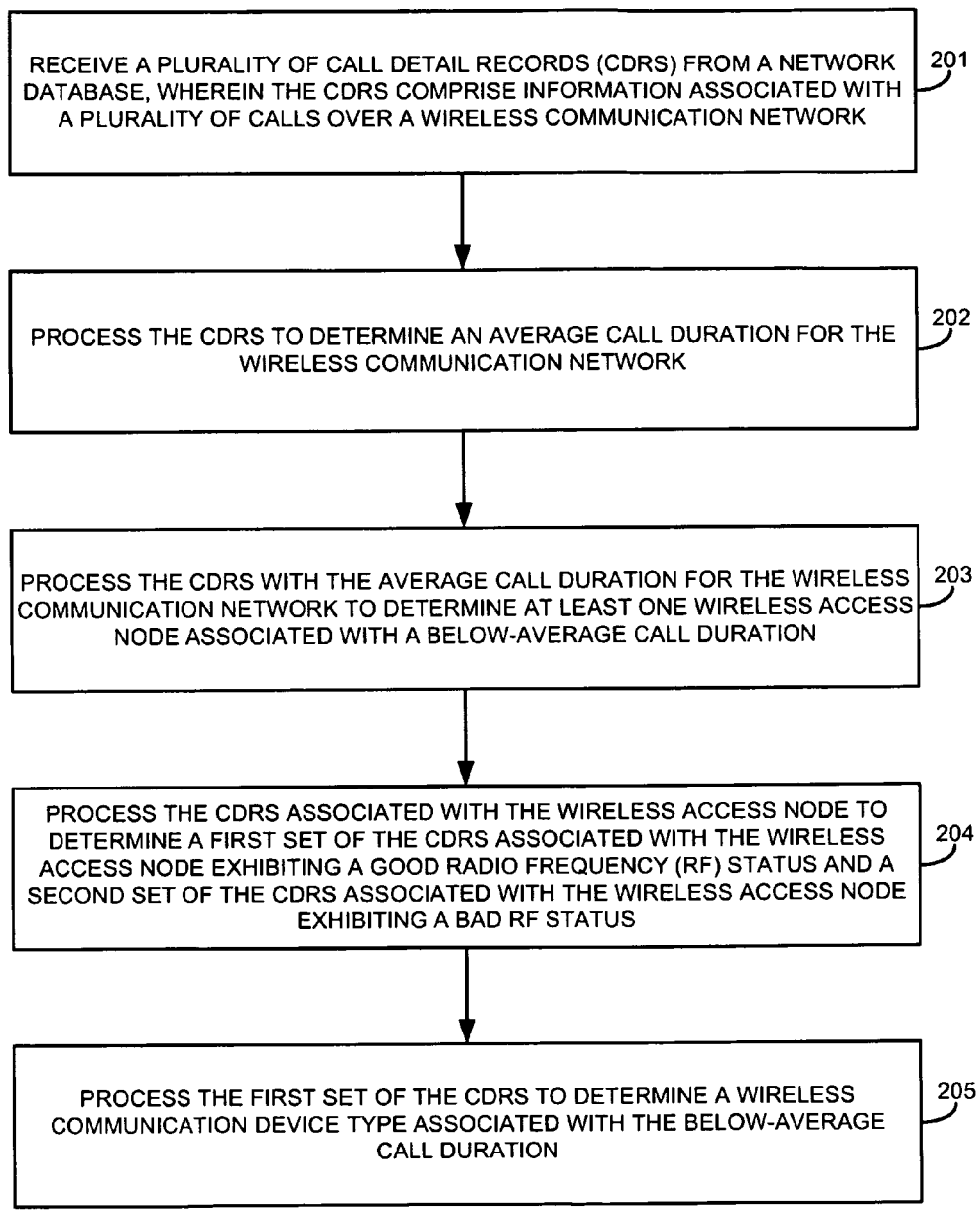
FIG. 2 is a flow diagram that illustrates an operation of the wireless communication network.

FIG. 2 is a flow diagram that illustrates an operation of wireless communication network 100. The steps of the operation are shown parenthetically. The operation begins with call duration analysis system 140 receiving a plurality of call detail records (CDRs) from network database 150 (operation 201). The plurality of CDRs comprises information associated with a plurality of calls over a wireless communication network 100. For example, each CDR could comprise a source device identifier and a target device identifier, such as a phone number, electronic serial number (ESN), mobile equipment identifier (MEID), or some other device identifier. Each CDR could further comprise a date, start time, stop time, and duration of a call, and indicate a source device type, a destination device type, an access node or nodes servicing the call, a radio frequency (RF) status, or any other information associated with a call over a wireless communication network.

Call duration analysis system 140 processes the CDRs to determine an average call duration for the wireless communication network 100 (operation 202). For example, the average call duration for the wireless communication network 100 could be calculated by, for each wireless access node in wireless communication network 100, multiplying the average call duration for the wireless access node by the number of calls on that node, summing the resultant products, and then dividing the resultant sum by the total calls on wireless communication network 100. The average call duration for each wireless access node may be calculated by summing the total call durations on the wireless access node and dividing the resultant sum by the number of calls on that node, and this calculation may be performed periodically or continuously and the results may be stored in the CDRs within network database 150.

The average call duration for the wireless communication network 100 could comprise the average call duration of every call ever serviced by wireless communication network 100. Alternatively, the average call duration for the wireless communication network 100 could comprise the average call duration of a subset of calls serviced by wireless communication network 100. For example, the average call duration for the wireless communication network 100 could comprise the average call duration for every call serviced by wireless communication network 100 for a specified time period, such as one day, one week, one month, or one year, or an average of the averages over many of such time periods. In one example, the average call duration for the wireless communication network 100 could comprise the average call duration for a particular calendar date from a previous year or specified number of years, and could be calculated as an average of the averages over the specified number of years. In another example, the average call duration for the wireless communication network 100 could comprise the average call duration for a particular day of the week for a particular month, such as the first Monday in the month of April, and could be calculated from a previous year or specified number of years, and could be calculated as an average of the averages over the specified number of years.

Call duration analysis system 140 processes the CDRs with the average call duration for the wireless communication network 100 to determine at least one wireless access node associated with a below-average call duration (operation 203). In one example, the wireless access node associated with the below-average call duration could be determined by comparing an average call duration for the wireless access node with the average call duration for the wireless communication network 100. For example, a wireless access node associated with a below-average call duration could be determined if an average call duration for the wireless access node is less than a call duration threshold based on the average call duration for the wireless communication network 100. The call duration threshold value could be predetermined, and may be calculated dynamically based on the average call duration for the wireless communication network 100. For example, the call duration threshold could be calculated as one third of the value of the average call duration for the wireless communication network 100.

Call duration analysis system 140 processes the CDRs associated with the wireless access node to determine a first set of the CDRs associated with the wireless access node exhibiting a good radio frequency (RF) status and a second set of the CDRs associated with the wireless access node exhibiting a bad RF status (operation 204). The good RF status and the bad RF status could be based on threshold values that represent sufficient communication performance. The threshold values could be predetermined, and may be optimized based on the noise and signal strength indicators of a serving wireless access node 120 or 130.

Call duration analysis system 140 processes the first set of the CDRs to determine a wireless communication device type 105 or 106 associated with the below-average call duration (operation 205). For example, call duration analysis system 140 may determine a wireless communication device type 105 or 106 associated with the below-average call duration by identifying a correlation between the below-average call duration and a particular device type. In one example, the correlation between the below-average call duration and a particular device type may be identified based on a predetermined threshold value, where the correlation is identified if the number of CDRs indicating the below-average call duration and the particular device type exceed the threshold value. In one embodiment, if call duration analysis system 140 determines that a particular wireless communication device type 105 or 106 is associated with the below-average call duration, system 140 may alert communication network 110 of the device type associated with the below-average call duration by triggering an alarm, sending a message, or some other notification method.

Referring back to FIG. 1, wireless communication devices 101-104 may each comprise any device that has wireless communication connectivity. Wireless communication devices 101-104 separately comprise hardware and circuitry programmed to function as a telecommunications device, such as Radio Frequency (RF) communication circuitry and an antenna. The RF communication circuitry typically includes an amplifier, filter, modulator, and signal processing circuitry. Wireless communication devices 101-104 may also include a user interface, memory device, software, processing circuitry, or some other communication components. For example, wireless communication devices 101-104 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication devices 101-104 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Internet, telephony, or any other wireless network protocol that facilitates communication between wireless communication devices 101-104 and wireless access nodes 120 and 130.

Wireless access nodes 120 and 130 comprise RF communication circuitry and an antenna. The RF communication circuitry typically includes an amplifier, filter, RF modulator, and signal processing circuitry. Wireless access nodes 120 and 130 may also comprise a router, server, memory device, software, processing circuitry, cabling, power supply, network communication interface, structural support, or some other communication apparatus. Each wireless access node 120 and 130 could be a base station, Internet access node, telephony service node, wireless data access point, or some other wireless communication system—including combinations thereof. Wireless network protocols that may be utilized by wireless access nodes 120 and 130 include CDMA, GSM, UMTS, HSPA, EV-DO, EV-DO rev. A, 3GPP LTE, WiMAX, Wi-Fi, Internet, telephony, or some other communication format—including combinations thereof.

Communication network 110 may comprise any network that provides a communication service for wireless communication devices 101-104 to send and receive data. Communication network 110 could comprise wireless communication nodes, telephony switches, internet routers, network gateways, computer systems, communication links, or some other type of communication equipment—including combinations thereof. Communication network 110 may be configured to communicate over metallic, wireless, or optical links. Communication network 110 may be configured to use time-division multiplexing (TDM), Internet Protocol (IP), Ethernet, optical networking, wireless protocols, communication signaling, or some other communication format—including combinations thereof.

Call duration analysis system 140 comprises a computer system and communication interface. Call duration analysis system 140 may also include other components such a router, server, data storage system, and power supply. Call duration analysis system 140 may reside in a single device or may be distributed across multiple devices. Call duration analysis system 140 may be a discrete system or may be integrated within other systems—including other systems within wireless communication network 100. For example, while call duration analysis system 140 is shown externally to wireless access nodes 120 and 130, system 140 could be integrated within the components of wireless access nodes 120 or 130. Likewise, while call duration analysis system 140 is shown externally to communication network 110, system 140 could also be integrated within the components of communication network 110. Call duration analysis system 140 could comprise a mobile switching center, network gateway system, Internet access node, application server, service node, or some other communication system—including combinations thereof. Call duration analysis system 140 is in communication with communication network 110 and network database 150.

Network database 150 could comprise a disk, tape, integrated circuit, server, or some other memory device. Network database 150 may reside in a single device or may be distributed among multiple memory devices. While network database 150 is shown within communication network 110, a portion or all of network database 150 may be externally located. Network database 150 stores call detail records (CDRs) related to calls serviced by wireless communication network 100. For example, a CDR stored within network database 150 may comprise a source number that placed a call, a destination number that received the call, a date, start time, stop time, and duration of the call, a source device type, a destination device type, an identifier of a wireless access node that participated in the exchange of communications during the call, a radio frequency (RF) status, and any other information about the call.

Wireless communication links 111-114 use the air or space as the transport medium. Wireless communication links 111-114 may use various protocols, such as CDMA, GSM, UMTS, HSPA, EV-DO, EV-DO rev. A, 3GPP LTE, WiMAX, Wi-Fi, Internet, telephony, or some other communication format—including combinations thereof. Communication links 121, 131, 141, and 142 use metal, air, space, optical fiber such as glass or plastic, or some other material as the transport media—including combinations thereof. Communication links 121, 131, 141, and 142 could use various communication protocols, such as TDM, IP, Ethernet, optical networking, wireless protocols, communication signaling, or some other communication format—including combinations thereof. Communication links 121, 131, 141, and 142 could be direct links or may include intermediate networks, systems, or devices. Note that while call duration analysis system 140 is shown as utilizing separate communication links 141 and 142, the communication path between call duration analysis system 140, network database 150, and communication network 110 may share portions of the same communication link, or utilize entirely the same link.

Figure 3:
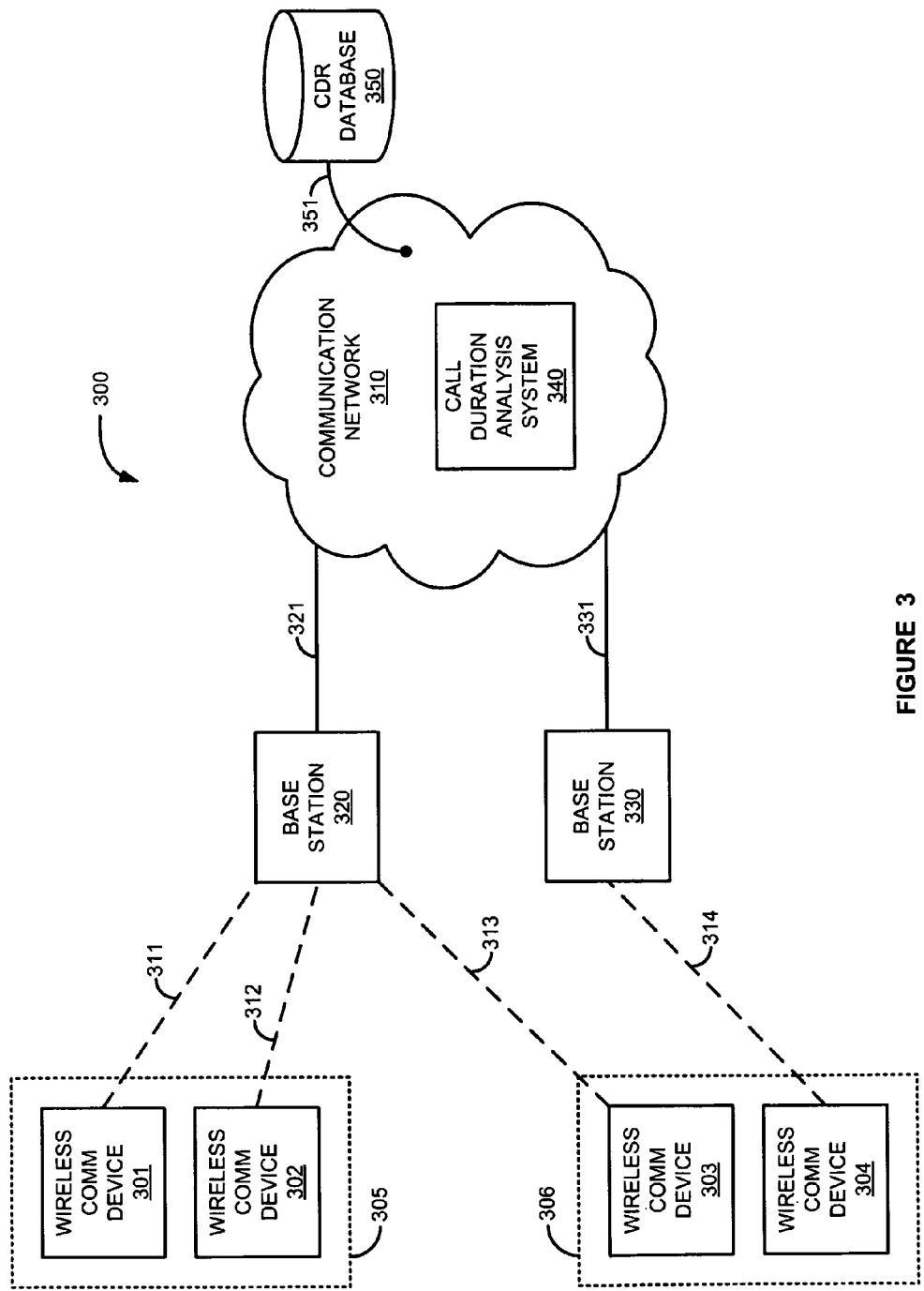
FIG. 3 is a block diagram that illustrates a wireless communication network.

FIG. 3 is a block diagram that illustrates wireless communication network 300. Wireless communication network 300 includes wireless communication devices 301-304, base stations 320 and 330, communication network 310, and CDR database 350. Communication network 310 includes call duration analysis system 340. CDR database 350 is in communication with communication network 310 over communication link 351. Wireless communication devices 301, 302, and 303 communicate with base station 320 over respective wireless communication links 311, 312, and 313. Likewise, wireless communication device 304 communicates with base station 330 over wireless communication link 314. Base stations 320 and 330 communicate with communication network 310 over respective communication links 321 and 331.

Figure 4:
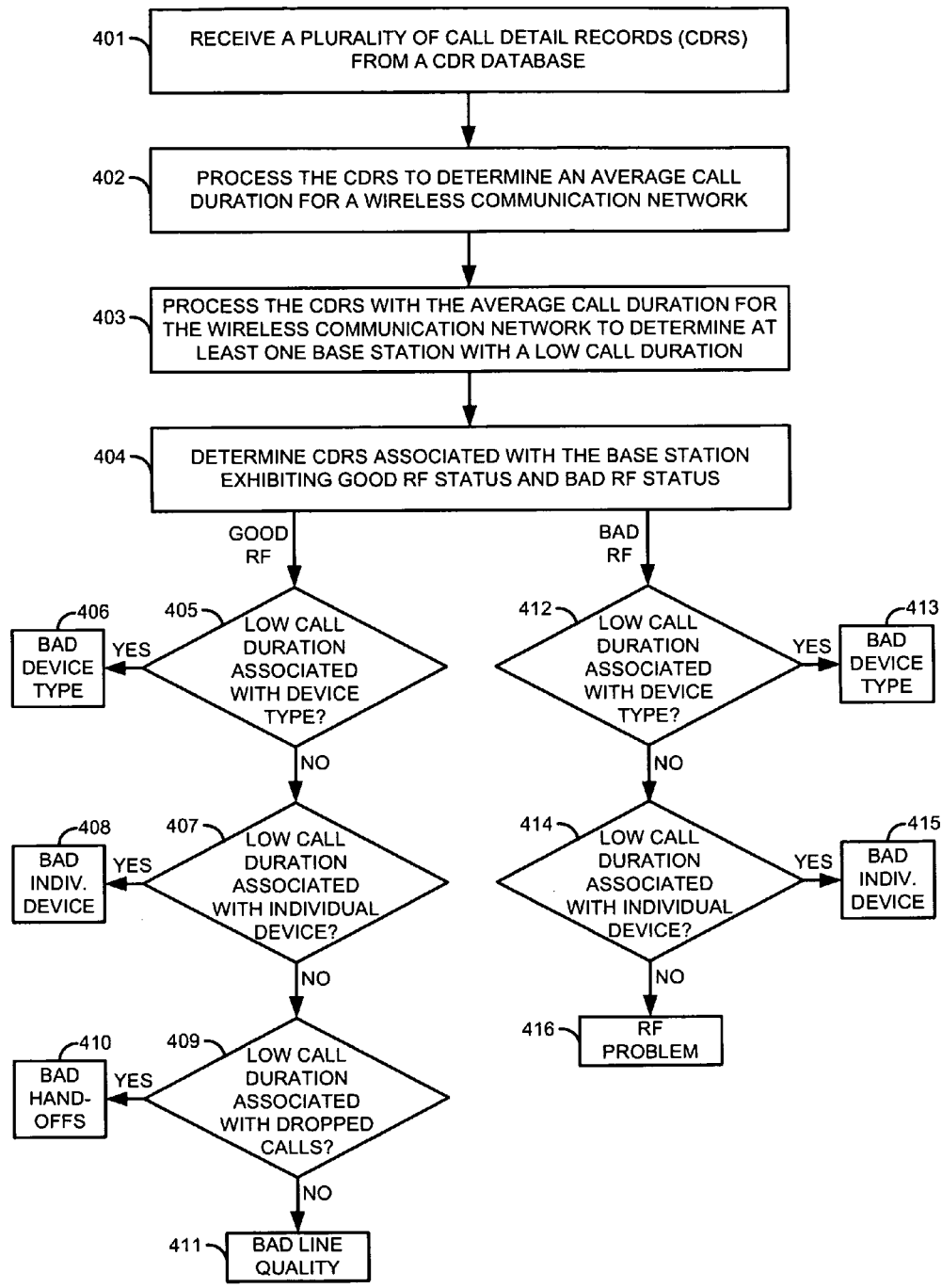
FIG. 4 is a flow diagram that illustrates an operation of the wireless communication network.

FIG. 4 is a flow diagram that illustrates an operation of wireless communication network 300. The steps of the operation are shown parenthetically. The operation begins with call duration analysis system 340 receiving a plurality of call detail records (CDRs) from CDR database 350 (operation 401). The plurality of CDRs comprises information associated with a plurality of calls over a wireless communication network 300.

Call duration analysis system 340 processes the CDRs to determine an average call duration for the wireless communication network 300 (operation 402). For example, the average call duration for the wireless communication network 300 could be calculated by, for each base station in wireless communication network 300, multiplying the average call duration for the base station by the number of calls on that base station, summing the resultant products, and then dividing the resultant sum by the total calls on wireless communication network 300. The average call duration for each base station may be calculated by summing the total call durations on the base station and dividing the resultant sum by the number of calls on that base station, and this calculation may be performed periodically or continuously and the results may be stored in the CDRs within CDR database 350.

Call duration analysis system 340 processes the CDRs with the average call duration for the wireless communication network 300 to determine at least one base station 320,330 associated with a low call duration (operation 403). In one example, the base station associated with the low call duration could be determined by comparing an average call duration for the base station with the average call duration for the wireless communication network 300. For example, a base station associated with a low call duration could be determined if an average call duration for that base station is less than a call duration threshold based on the average call duration for the wireless communication network 300. The call duration threshold value could be predetermined, and may be calculated dynamically based on the average call duration for the wireless communication network 300. For example, the call duration threshold could be calculated as one third of the value of the average call duration for the wireless communication network 300.

Call duration analysis system 340 processes the CDRs associated with the base station to determine a first set of the CDRs associated with the base station exhibiting a good radio frequency (RF) status and a second set of the CDRs associated with the base station exhibiting a bad RF status (operation 404). The good RF status and the bad RF status could be based on threshold values that represent sufficient communication performance. The threshold values could be predetermined, and may be optimized based on the noise and signal strength indicators of a serving base station 320 or 330.

Call duration analysis system 340 processes the first set of the CDRs associated with the base station exhibiting a good RF status to determine a wireless communication device type 305 or 306 associated with the low call duration (operation 405). For example, call duration analysis system 340 may determine a wireless communication device type 305 or 306 associated with the low call duration by identifying a correlation between the low call duration and a particular device type. In one example, the correlation between the low call duration and a particular device type may be identified based on a predetermined threshold value, where the correlation is identified if the number of CDRs indicating the low call duration and the particular device type exceed the threshold value. If call duration analysis system 340 determines that a particular wireless communication device type 305 or 306 is associated with the low call duration, then that device type is determined to be a bad device type (operation 406). In addition, call duration analysis system 340 may alert communication network 310 of the bad device type by triggering an alarm, sending a message, or some other notification method.

However, if no correlation is found between a device type and the low call duration, call duration analysis system 340 processes the first set of the CDRs associated with the base station exhibiting a good RF status to determine if an individual wireless communication device 301-304 is associated with the low call duration (operation 407). For example, call duration analysis system 340 may determine an individual wireless communication device 301-304 associated with the low call duration by identifying a correlation between the low call duration and a particular individual device. In one example, the correlation between the low call duration and a particular individual device may be identified based on a predetermined threshold value, where the correlation is identified if the number of CDRs indicating the low call duration and the particular individual device exceed the threshold value. If call duration analysis system 340 determines that a particular individual wireless communication device 301-304 is associated with the low call duration, then that individual device is determined to be a bad individual device (operation 408). In addition, call duration analysis system 340 may alert communication network 310 of the bad individual device by triggering an alarm, sending a message, or some other notification method.

If no correlation is found between an individual wireless communication device and the low call duration, call duration analysis system 340 processes the first set of the CDRs associated with the base station exhibiting a good RF status to determine dropped calls associated with the low call duration (operation 409). For example, call duration analysis system 340 may determine dropped calls associated with the low call duration by identifying a correlation between the low call duration and dropped calls associated with the base station. In one example, the correlation between the low call duration and the dropped calls may be identified based on a predetermined threshold value, where the correlation is identified if the number of CDRs indicating the low call duration and the dropped calls exceed the threshold value. If call duration analysis system 340 determines that dropped calls are associated with the low call duration, then system 340 determines that the base station is performing bad hand-offs (operation 410). In addition, call duration analysis system 340 may alert communication network 310 of the dropped calls and bad hand-offs by the base station by triggering an alarm, sending a message, or some other notification method.

However, if call duration analysis system 340 does not determine that the low call duration is associated with dropped calls, call duration analysis system 340 determines by process of elimination that the low call duration is caused by a bad line quality of the base station (operation 411). A bad line quality of the base station indicates that communication link 321 of base station 320, or communication link 331 of base station 330, is exhibiting insufficient communication performance. For example, link 321 may be overloaded by a large number of users attempting to simultaneously utilize base station 320, or link 321 may be physically damaged or severed. In addition, call duration analysis system 340 may alert communication network 310 of the bad line quality of the base station by triggering an alarm, sending a message, or some other notification method.

Referring again to operation 404, after call duration analysis system 340 processes the CDRs associated with the base station with the low call duration to determine the first and second sets of the CDRs (operation 404), call duration analysis system 340 processes the second set of the CDRs associated with the base station exhibiting a bad RF status to determine a wireless communication device type 305 or 306 associated with the low call duration (operation 412). For example, call duration analysis system 340 may determine a wireless communication device type 305 or 306 associated with the low call duration by identifying a correlation between the low call duration and a particular device type. In one example, the correlation between the low call duration and a particular device type may be identified based on a predetermined threshold value, where the correlation is identified if the number of CDRs indicating the low call duration and the particular device type exceed the threshold value. If call duration analysis system 340 determines that a particular wireless communication device type 305 or 306 is associated with the low call duration, then that device type is determined to be a bad device type (operation 413). In addition, call duration analysis system 340 may alert communication network 310 of the bad device type by triggering an alarm, sending a message, or some other notification method.

If no correlation is found between a device type and the low call duration, call duration analysis system 340 processes the second set of the CDRs associated with the base station exhibiting a bad RF status to determine if an individual wireless communication device 301-304 is associated with the low call duration (operation 414). For example, call duration analysis system 340 may determine an individual wireless communication device 301-304 associated with the low call duration by identifying a correlation between the low call duration and a particular individual device. In one example, the correlation between the low call duration and a particular individual device may be identified based on a predetermined threshold value, where the correlation is identified if the number of CDRs indicating the low call duration and the particular individual device exceed the threshold value. If call duration analysis system 340 determines that a particular individual wireless communication device 301-304 is associated with the low call duration, then that individual device is determined to be a bad individual device (operation 415). In addition, call duration analysis system 340 may alert communication network 310 of the bad individual device by triggering an alarm, sending a message, or some other notification method.

However, if call duration analysis system 340 does not determine that the low call duration is associated with a bad individual device, call duration analysis system 340 determines by process of elimination that the low call duration is caused by an RF problem with the base station (operation 416). For example, an RF problem with the base station could indicate that components of the base station responsible for providing the air interface to wireless communication devices 301-304, such as an antenna, transceiver, or associated circuitry, are exhibiting insufficient communication performance and may be malfunctioning. In another example, the spectrum utilized by the air interface of base station 320 may be overloaded by a large number of users attempting to simultaneously communicate with base station 320, resulting in loss of bandwidth, deep signal fades, and other RF problems. In response to determining that the low call duration is caused by an RF problem with the base station, call duration analysis system 340 may alert communication network 310 of the RF problem with the base station by triggering an alarm, sending a message, or some other notification method.

FIG. 5 illustrates exemplary call detail records (CDRs) 501. CDRs 501 provide an example of CDR data that may be stored in network database 150 or CDR database 350, although databases 150 and 350 may store data in other configurations or data structures, and may comprise additional fields and/or additional data not depicted in CDRs 501. The ellipses depicted at the bottom of CDRs 501 indicate that additional data may exist, but is not shown in CDRs 501 for clarity.

The first row of CDRs 501 comprises a number of data types or fields related to details of a call that passed through a wireless communication network. The fields shown are "rec", "source", "destination", "date", "start time", "stop time", "duration", "source device type", "destination device type", "base station", and "RF status". "Rec" represents a record number for indexing purposes. "Source" and "destination" represent a source and destination number, respectively. "Date", "start time", and "stop time" represent the date the call was placed, the time the call began, and the time the call terminated, respectively. "Duration" is the total duration of the call and is calculated by subtracting the "start time" from the "stop time". "Source device type" and "destination device type" represent particular types of devices associated with the "source" and "destination" numbers, respectively. For example, the "source device type" could comprise device type 105 as discussed with regard to FIG. 1. Finally, "base station" represents a serving base station that handled the call, and "RF status" represents the wireless communication performance of the serving base station.

In CDRs 501, record numbers 1-6 have been processed with the average call duration for a wireless communication network, resulting in a determination that base station 1101A is associated with a below-average call duration. Since the RF status values all indicate a good RF status ranging from 29 dBm to 33 dBm, CDRs 501 are exemplary of a first set of the CDRs associated with the base station with below-average call duration that exhibit a good RF status. While only a single base station is listed in CDRs 501, multiple base stations that may participate in the call may also be included, but are not shown for clarity. To simplify the following discussion, an assumption is made that all "source" and "destination" communication devices shown in CDRs 501 were in communication with base station 1101A for all records 1-6.

The CDRs 501 are processed to determine a wireless communication device type associated with the below-average call duration of base station 1101A. In this example, assume the average call duration for the wireless communication network comprising base station 1101A is 30 minutes, and a below-average call duration is determined by a threshold value of one third of the average call duration for the wireless communication network, or 10 minutes. Thus, any record 1-6 with a call duration lower than 10 minutes is considered to have a below-average call duration. In CDRs 501, records 1, 3, and 6 all have below-average call durations of 2, 1, and 2 minutes, respectively, as indicated by the gray shading in the "duration" column. To determine a wireless communication device type associated with the below-average call durations, the "source device type" and "destination device type" columns in records 1, 3, and 6 are analyzed to determine a correlation between a device type and the below-average call duration. As shown by the gray shading in the "source device type" and "destination device type" columns in records 1, 3, and 6, device type A is always a party to the calls having a below-average call duration. Thus, device type A is a wireless communication device type associated with the below-average call duration of base station 1101A. In response to determining that the low call duration on base station 1101A is associated with device type A, the wireless communication network comprising base station 1101A may be notified by triggering an alarm, sending a message, or some other notification method.

Figure 6:
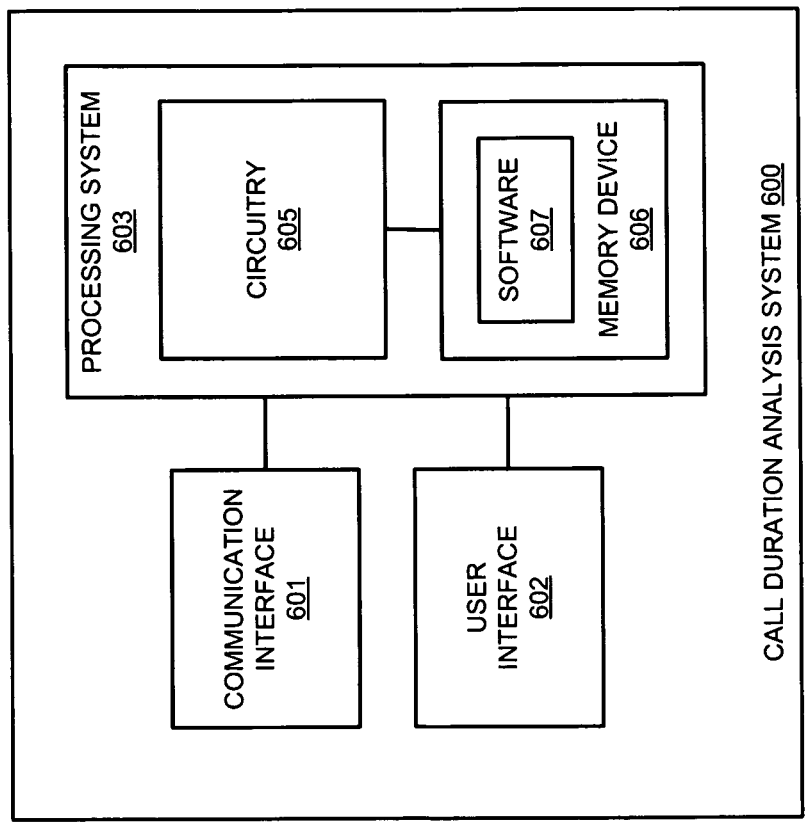
FIG. 6 is a block diagram that illustrates a call duration analysis system.

FIG. 6 is a block diagram that illustrates call duration analysis system 600. Call duration analysis system 600 provides an example of call duration analysis systems 140 and 340, although systems 140 and 340 may use alternative configurations. Call duration analysis system 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use time-division multiplexing (TDM), Internet Protocol (IP), Ethernet, optical networking, wireless protocols, communication signaling, or some other communication format—including combinations thereof. Communication interface 601 is capable of receiving a plurality of call detail records (CDRs) from a network database.

User interface 602 comprises components that interact with a user. User interface 602 may include a keyboard, display screen, mouse, touch pad, touch screen, or some other user input/output apparatus. User interface 602 may be omitted in some examples.

Processing circuitry 605 comprises microprocessor and other circuitry that retrieves and executes operating software 607 from memory device 606. Memory device 606 comprises a disk drive, flash drive, data storage circuitry, or some other memory apparatus. Operating software 607 comprises computer programs, firmware, or some other form of machine-readable processing instructions. Operating software 607 may include an operating system, utilities, drivers, network interfaces, applications, or some other type of software. When executed by circuitry 605, operating software 607 directs processing system 603 to operate call duration analysis system 600 as described herein. In particular, operating software 607 directs processing system 603 to process a plurality of call detail records (CDRs) to determine an average call duration for a wireless communication network, process the CDRs with the average call duration for the wireless communication network to determine at least one wireless access node with a below-average call duration, process the CDRs associated with the wireless access node to determine a first set of the CDRs associated with the wireless access node exhibiting a good radio frequency (RF) status and a second set of the CDRs associated with the wireless access node exhibiting a bad RF status, and process the first set of the CDRs to determine a wireless communication device type associated with the below-average call duration.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a call duration analysis system, the method comprising:
    receiving a plurality of call detail records (CDRs) from a network database, wherein the CDRs comprise information associated with a plurality of calls over a wireless communication network;
    processing the CDRs to determine an average call duration for the wireless communication network;
    processing the CDRs with the average call duration for the wireless communication network to determine at least one wireless access node associated with a below-average call duration, wherein the below-average call duration is determined by comparing an average call duration for the wireless access node with the average call duration for the wireless communication network;
    processing the CDRs associated with the wireless access node to determine a first set of the CDRs associated with the wireless access node exhibiting a good radio frequency (RF) status and a second set of the CDRs associated with the wireless access node exhibiting a bad RF status; and
    processing the first set of the CDRs to determine a wireless communication device type associated with the below-average call duration.

2. The method of claim 1 further comprising:
    processing the first set of the CDRs associated with the wireless access node to determine an individual wireless communication device associated with the below-average call duration.

3. The method of claim 1 further comprising:
    processing the first set of the CDRs associated with the wireless access node to determine dropped calls associated with the below-average call duration.

4. The method of claim 1 further comprising:
    processing the first set of the CDRs associated with the wireless access node to determine a bad line quality of the wireless access node associated with the below-average call duration.

5. The method of claim 1 further comprising:
    processing the second set of the CDRs associated with the wireless access node to determine a wireless communication device type associated with the below-average call duration.

6. The method of claim 1 further comprising:
    processing the second set of the CDRs associated with the wireless access node to determine an individual wireless communication device associated with the below-average call duration.

7. The method of claim 1 further comprising:
    processing the second set of the CDRs associated with the wireless access node to determine an RF problem of the wireless access node associated with the below-average call duration.

8. The method of claim 1 wherein the good RF status and the bad RF status are determined based on threshold values.

9. The method of claim 1 wherein processing the CDRs with the average call duration for the wireless communication network to determine the at least one wireless access node associated with the below-average call duration comprises determining whether an average call duration for the wireless access node is less than a call duration threshold based on the average call duration for the wireless communication network.

10. A computer apparatus comprising:
    software instructions configured, when executed by a processing system, to direct the processing system to:
        process a plurality of call detail records (CDRs) to determine an average call duration for a wireless communication network,
        process the CDRs with the average call duration for the wireless communication network to determine at least one wireless access node associated with a below-average call duration, wherein the below-average call duration is determined by comparing an average call duration for the wireless access node with the average call duration for the wireless communication network,
        process the CDRs associated with the wireless access node to determine a first set of the CDRs associated with the wireless access node exhibiting a good radio frequency (RF) status and a second set of the CDRs associated with the wireless access node exhibiting a bad RF status, and
        process the first set of the CDRs to determine a wireless communication device type associated with the below-average call duration; and
    at least one non-transitory computer-readable storage medium storing the software instructions.

11. The computer apparatus of claim 10 further comprising:
the software instructions configured to direct the processing system to process the first set of the CDRs associated with the wireless access node to determine an individual wireless communication device associated with the below-average call duration.

12. The computer apparatus of claim 10 further comprising:
the software instructions configured to direct the processing system to process the first set of the CDRs associated with the wireless access node to determine dropped calls associated with the below-average call duration.

13. The computer apparatus of claim 10 further comprising:
the software instructions configured to direct the processing system to process the first set of the CDRs associated with the wireless access node to determine a bad line quality of the wireless access node associated with the below-average call duration.

14. The computer apparatus of claim 10 further comprising:
the software instructions configured to direct the processing system to process the second set of the CDRs associated with the wireless access node to determine a wireless communication device type associated with the below-average call duration.

15. The computer apparatus of claim 10 further comprising:
the software instructions configured to direct the processing system to process the second set of the CDRs associated with the wireless access node to determine an individual wireless communication device associated with the below-average call duration.

16. The computer apparatus of claim 10 further comprising:
the software instructions configured to direct the processing system to process the second set of the CDRs associated with the wireless access node to determine an RF problem of the wireless access node associated with the below-average call duration.

17. The computer apparatus of claim 10 wherein the good RF status and the bad RF status are determined based on threshold values.

18. The computer apparatus of claim 10 wherein the software instructions configured to direct the processing system to process the CDRs with the average call duration for the wireless communication network to determine the at least one wireless access node associated with the below-average call duration comprises the software instructions configured to direct the processing system to determine whether an average call duration for the wireless access node is less than a call duration threshold based on the average call duration for the wireless communication network.

19. A call duration analysis system comprising:
a first means for receiving a plurality of call detail records (CDRs) from a network database, wherein the CDRs comprise information associated with a plurality of calls over a wireless communication network; and
a second means for processing the CDRs to determine an average call duration for the wireless communication network, processing the CDRs with the average call duration for the wireless communication network to determine at least one wireless access node associated with a below-average call duration, wherein the below-average call duration is determined by comparing an average call duration for the wireless access node with the average call duration for the wireless communication network, processing the CDRs associated with the wireless access node to determine a first set of the CDRs associated with the wireless access node exhibiting a good radio frequency (RF) status and a second set of the CDRs associated with the wireless access node exhibiting a bad RF status, and processing the first set of the CDRs to determine a wireless communication device type associated with the below-average call duration.

* * * * *